June 18, 1957 R. JANCZYSZYN 2,796,111
VEHICLE BED
Filed March 17, 1954 2 Sheets-Sheet 1

INVENTOR.
Roman Janczyszyn,
BY

June 18, 1957 R. JANCZYSZYN 2,796,111
VEHICLE BED
Filed March 17, 1954 2 Sheets-Sheet 2
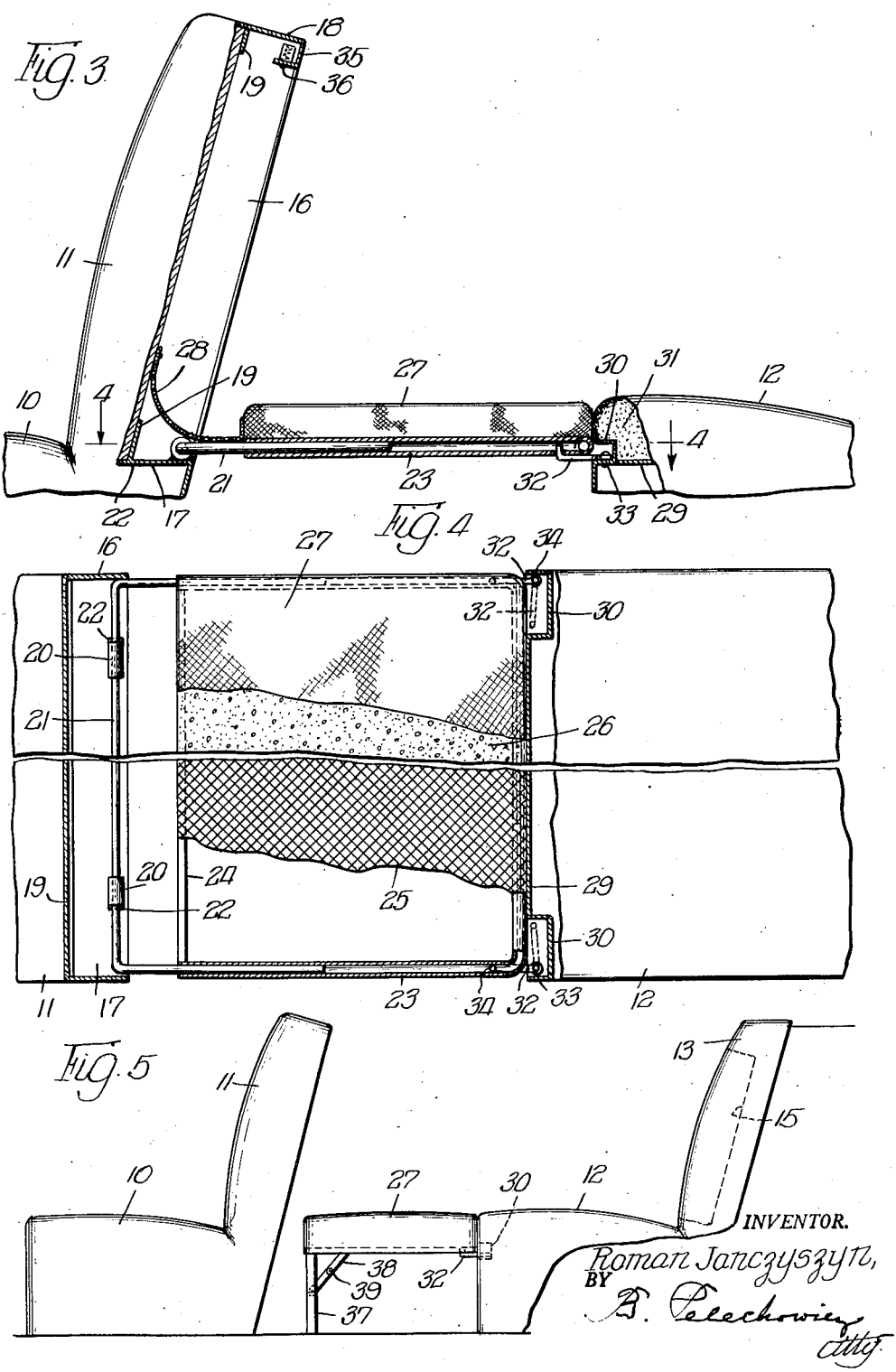
INVENTOR.
Roman Janczyszyn,
BY United States Patent Office 2,796,111
Patented June 18, 1957

2,796,111

VEHICLE BED

Roman Janczyszyn, Chicago, Ill.

Application March 17, 1954, Serial No. 416,740

1 Claim. (Cl. 155—7)

The present invention relates to foldable beds for use in automobiles and other vehicles, and has for its main object the provision of a bed which may be foldable into the back of a vehicle seat.

Another object of the present invention is the provision of a suitable housing in the rear portion of the back of a vehicle seat wherein a bed may be received when in an inoperative position and out of which it may be withdrawn into a horizontal operative position.

Another object of the present invention is the provision of a bed of the character indicated hingedly supported by the back of the front seat of a vehicle, with means for engaging the free end of the bed carried by the rear seat of a vehicle when the bed is brought to its horizontal operative position.

A still further object of the present invention is the provision of an extensible frame upon which the bed of the character indicated is supportable, whereby the bed when in an operative position may be shifted toward the rear seat of a vehicle and there engaged for the purpose of holding the seat in its extended, horizontal operative position.

With the above general objects in view and others that will appear as the invention is better understood, the same consists in the novel construction, combination and arrangement of parts hereinafter more fully described, illustrated in the accompanying drawings and pointed out in the appended claim.

In the drawings forming a part of this application and in which like designating characters refer to corresponding parts throughout the several views:

Fig. 3 is an enlarged side elevational view, partly in section, of the front back and the rear seat, with the present bed in an intermediate position therebetween while in an open operative position;

Fig. 4 is a cross sectional view, partly in elevation, on a horizontal plane through the front back and the rear seat with the bed therebetween in an operative position, the view having been taken on line 4—4 of Fig. 3; and Fig. 5 is a side elevational view of the two automobile seats including their backs, with a bed of a modified construction disposed therebetween.

Figure 1:
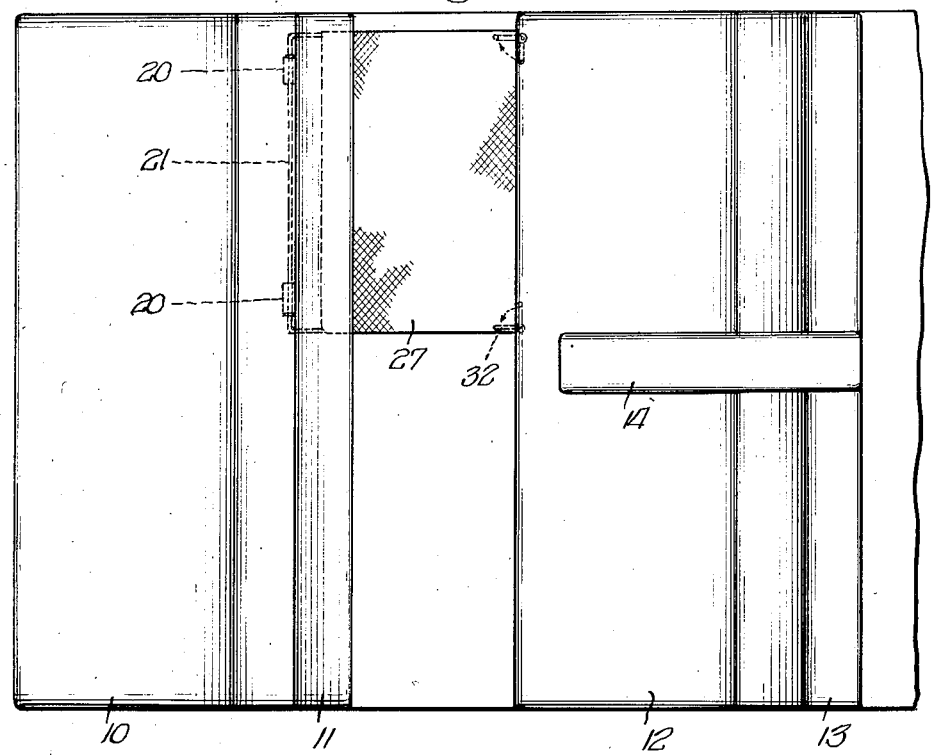
Fig. 1 is a top plan view of front and rear seats in an automobile, including the backs, and the present bed in an open operative position.

Referring in detail to the present drawings there are shown front seat 10 with its back 11, and rear seat 12 with its back 13. Intermediately of the ends of the rear seat 12 there is an arm rest 14 which may be moved out of or into housing 15 (Fig. 5) made in the rear back 13.

Built into the front back 11, adjacent its rear face, is a substantially rectangular frame 16, having four sides, including the bottom side 17 and top side 18. Said frame 16 is made of a rigid, preferably metallic material. Adjacent the inner end thereof said frame 16 is provided with an inwardly extending flange 19, which in conjunction with the inner end of said frame 16 defines a corner within which the body of back 11, or a foundation thereof, is receivable, and to which said frame 16 may be rigidly attached.

Welded or otherwise rigidly attached to the bottom side 17 of frame 16 is a plurality of sleeves 20. The central portion of a U-shaped frame rod 21 is receivable within said sleeves 20 wherein said central portion of said U-shaped frame rod 21 is adapted for rotary shifting movement. Thus said sleeves 20 define a hinge upon which said U-shaped frame rod 21, and with it the bed, is capable of angular shifting movement. In contacting relation with the outer ends of said sleeves 20 are either cotter pins or washers 22 rigidly affixed to said central portion of the U-shaped frame rod 21 for preventing the longitudinal shifting movement of said central portion in and with relation to said sleeves 20.

The frame of the bed further includes a U-shaped tubular member 23 within the free ends of which the free ends of said U-shaped frame rod 21 are receivable in telescopic relation whereby said frame member 23 and with it the bed is capable of shifting movement to or away from said frame 16.

The free ends of said U-shaped tubular frame member 23 are connected by bar 24 which remains in a parallel relation with said central portion of the U-shaped frame rod 21, as is clearly seen in Fig. 4.

Spread over said tubular frame member 23 and said bar 24 and suitably attached thereto is spring wire netting 25. Supported thereover is sponge rubber pad 26. Covering 27 made of fabric or of waterproof or other suitable material is spread over said pad 26 and is also in any suitable manner attached to the bed frame including said U-shaped tubular frame member 23 and bar 24. It will therefore be seen that the bed includes the frame consisting of said U-shaped tubular member 23 and bar 24, netting 25, pad 26 and covering 27. Said bed is capable of shifting with relation to said free ends of said U-shaped frame rod 21, to or away from said frame 16 as well as to or away from the rear seat 12.

Affixed to the rear portion of front seat back 11 which remains within the space defined by said frame 16, and to the adjacent edge of the bed is a piece of cloth 28 the function of which is to provide a covering for the opening intermediately of said central portion of the U-shaped frame rod 21 and bar 24 for preventing the falling thereinto of the occupant's foot or other members of his body. Thus said cloth 28 acts as a guard for the purpose stated. Said cloth 28 is of sufficient width so as to permit the full extension of the bed upon the free ends of said U-shaped frame rod 21.

Adjacent the front edge of rear seat 12 frame 29 thereof is provided with a pair of housings 30, disposed below cushion 31 of said rear seat 12. Each of said housings 30 is of an oblong formation, and adjacent the outer ends thereof carries hook 32 which is of an L-shaped formation, and by its inner end is pivoted to said frame 29 and within the bottom of said housing 30, as at 33. Each of said hooks 32 is capable of angular shifting movement, as seen in Figs. 1 and 4. When said hooks 32 are shifted to their operative position, indicated by full lines in Fig. 4, the same remain in alinement with the ends of said U-shaped tubular frame member 23.

The ends of said U-shaped tubular frame member 23, adjacent the free side of the bed are provided at their lowermost points with apertures 34 within which the vertical portions of said hooks 32 are adapted to enter for the purpose of engaging the bed frame and preventing the downward shifting of the bed past said hooks 32, or horizontal shifting of the bed away from the rear seat 12. Thus said hooks 32 provide supporting means for the bed at the adjacent edge thereof and define means for engaging the bed with the rear seat 12.

When the bed is swung into its inoperative position within said frame 16 said hooks 32 may be swung upon their pivots 33 to their inoperative position within housings 30, as indicated by dotted lines in Fig. 4.

Figure 2:
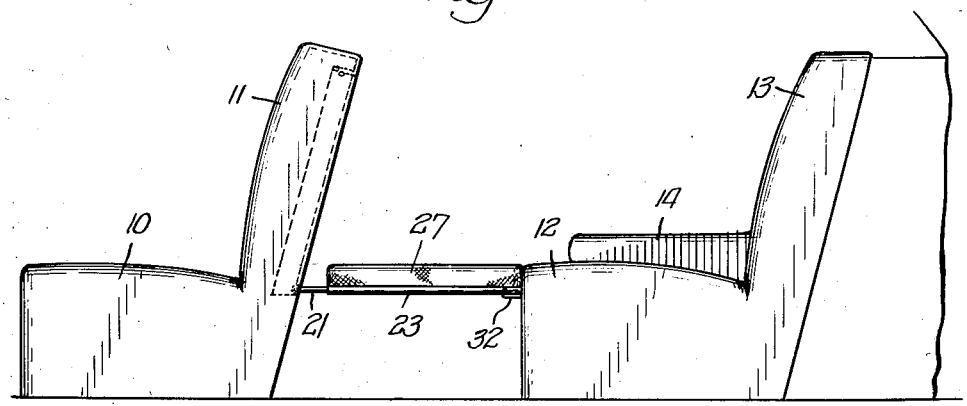
Fig. 2 is a side elevational view of the same parts.

Downwardly depending from the free edge of the top side 18 of frame 16 is molding 35 which carries one or more spring actuated latch bolts 36 which are adapted to enter in the alined depressions (not shown) made in the central portion of the U-shaped tubular frame member 23 for engaging said central portion for the purpose of maintaining the bed frame and the bed in their folded inoperative position within frame 16. Mere pull upon the adjacent side of the bed will disengage the said central portion of said U-shaped tubular frame member 23 from its engagement with said bolts 36 preparatory to its bringing to the open operative position shown in Figs. 1, 2 and 3.

When in its folded position within frame 16 the ends of said U-shaped tubular frame member 23 will be shifted upon the free ends of said U-shaped frame rod 21 until the adjacent edge of bed 27, or more specifically bar 24, comes in contact with sleeves 20. By virtue of this arrangement the bed completely fills the space between the vertical sides of frame 16 in a horizontal direction and the space defined by said molding 35 and sleeves 20 on vertical direction.

By virtue of the fact that bed 27 is extensible upon the U-shaped frame rod 21 to or away from the rear seat 12, the bed may be fitted into any make of an automobile and into any space within reasonable distance from the front back 11 to the rear seat 12.

As is seen in Fig. 1 bed 27 occupies less than one-half of the width of the vehicle tonneau. Since the bed is on a plane of the rear seat 12 both may be simultaneously occupied by a person of a small stature, such as a child, reclining on both lengthwise of the vehicle. A bed such as herein disclosed occupying the entire width of the vehicle may be provided to be occupied by an adult.

In the modified construction illustrated in Fig. 5 bed 27 instead of being made foldable within the rear portion of the front back 11 is provided with two or more foldable legs 37, one at each corner of one side of bed 27, with a coacting foldable brace 38 pivoted by its ends to said leg 37 and to the bed frame. Intermediately of its ends brace 38 is broken and connected by pivot 39 permitting folding or extending of said brace 38. At the opposite side of the bed hooks 32, same as in the preferred form of the invention, pivotally connect with the seat frame for engaging the bed at that edge with the rear seat 12.

Although in the foregoing description an automobile is being referred as the vehicle with which the present bed may be used, other vehicles, such as railroads, are not excluded.

As is apparent from the hereinabove description said frame 16 defines a housing closed at its inner end by the adjacent body portion of said back 11, with its opposite end open. The open end of said housing is coextensive with the rear face of said back 11.

While there is described herein preferred embodiments of the present invention, it is nevertheless to be understood that minor changes may be made therein without departing from the spirit and scope of the invention as claimed.

What I claim is new is:

In a vehicle including a forwardly disposed seat and a rearwardly disposed seat, said seats being in a mutually spaced relation, the forwardly disposed seat having a vertically extending back attached thereto adjacent the space defined by the two seats, a housing within said back, said housing having an open end coextensive with the rear face of said back, an extensible frame, a hinge carried by the lowermost wall of said housing, one end of said frame being connected to said hinge, a bed supported by said extensible frame adjacent the opposite end thereof, said extensible frame and said bed being adapted for angular shifting movement upon said hinge for alternately assuming an inopeartive vertical position or a horizonal operative position, when in said vertical position said extensible frame and said bed being adapted for reception within said housing through the open end thereof, when in said horizontal operative position said extensible frame and said bed being adapted to repose within the space defined by the two seats, when in said latter position said extensible frame permitting shifting of said bed into a contactual edge to edge relation with the said rearwardly disposed seat, releasable means within said housing for engaging said extensible frame for maintaining the latter and said bed in said vertical inoperative position while in said housing, means carried by the said rearwardly disposed seat for engaging the opposite end of said extensible frame for maintaining said bed in an edge to edge relation with said rearwardly disposed seat when said extensible frame and said bed have been swung to the horizontal operative position, and a flexible guard attached to and extending between the front of said housing and the front edge of said bed.

References Cited in the file of this patent

UNITED STATES PATENTS

| | | |
|---|---|---|
| 1,390,177 | Taylor | Sept. 6, 1921 |
| 1,401,177 | Mitchell | Dec. 27, 1921 |
| 1,507,607 | Kelly | Sept. 9, 1924 |
| 1,548,334 | Sebell | Aug. 4, 1925 |
| 1,632,233 | Johnson | June 14, 1927 |
| 2,481,943 | Murphy et al. | Sept. 13, 1949 |